United States Patent [19]

Lilja et al.

[11] Patent Number: 4,888,684
[45] Date of Patent: Dec. 19, 1989

[54] MULTIPROCESSOR BUS PROTOCOL

[75] Inventors: David J. Lilja, Sunnyvale; A. Richard Zacher, Los Gatos; Steven W. Wierenga, Sunnyvale, all of Calif.

[73] Assignee: Tandem Computers Incorporated, Cupertino, Calif.

[21] Appl. No.: 845,906

[22] Filed: Mar. 28, 1986

[51] Int. Cl.⁴ .................. G06F 13/00; G06F 13/12; G06F 13/14; G06F 13/22
[52] U.S. Cl. .................. 364/200; 364/241; 364/241.1; 364/228.3; 364/271.5; 364/229.2; 364/240.8; 364/240.9; 364/240.1
[58] Field of Search ... 364/200 MS File, 900 MS File

[56] References Cited

U.S. PATENT DOCUMENTS

| 3,668,649 | 6/1972 | Pedersen et al. | 364/200 |
| 4,369,864 | 1/1987 | Katzman | 364/200 |
| 4,447,871 | 5/1984 | Terada | 364/200 |
| 4,471,425 | 9/1984 | Yamaguchi et al. | 364/200 |
| 4,481,572 | 11/1984 | Ochsner | 364/200 |
| 4,636,939 | 1/1987 | Fildes | 364/200 |

Primary Examiner—David Y. Eng
Assistant Examiner—Emily Y. Chan
Attorney, Agent, or Firm—Townsend and Townsend

[57] ABSTRACT

A bus protocol system for interprocessor communications in valves polling the processors of a multiprocessor unit in an open loop fashion to determine which processors are ready to send. Upon completion of a simultaneous poll of all processors the system identifies which processor are ready to send by utilizing a send mask generated by the ready processors. The ready processors are sequentially selected as send processors and granted access to the bus for a complete data transfer cycle unless the selected processor indicates it is not ready to send. The system also includes a timing signal system that provides for a high data transfer rate. A send clock signal strobes words onto the bus from a send processor and a receive clock signal loads words from the bus to a receive processor. The send processor generates the receive clock signal by delaying the send clock signal by a fixed delay, DR.

14 Claims, 11 Drawing Sheets

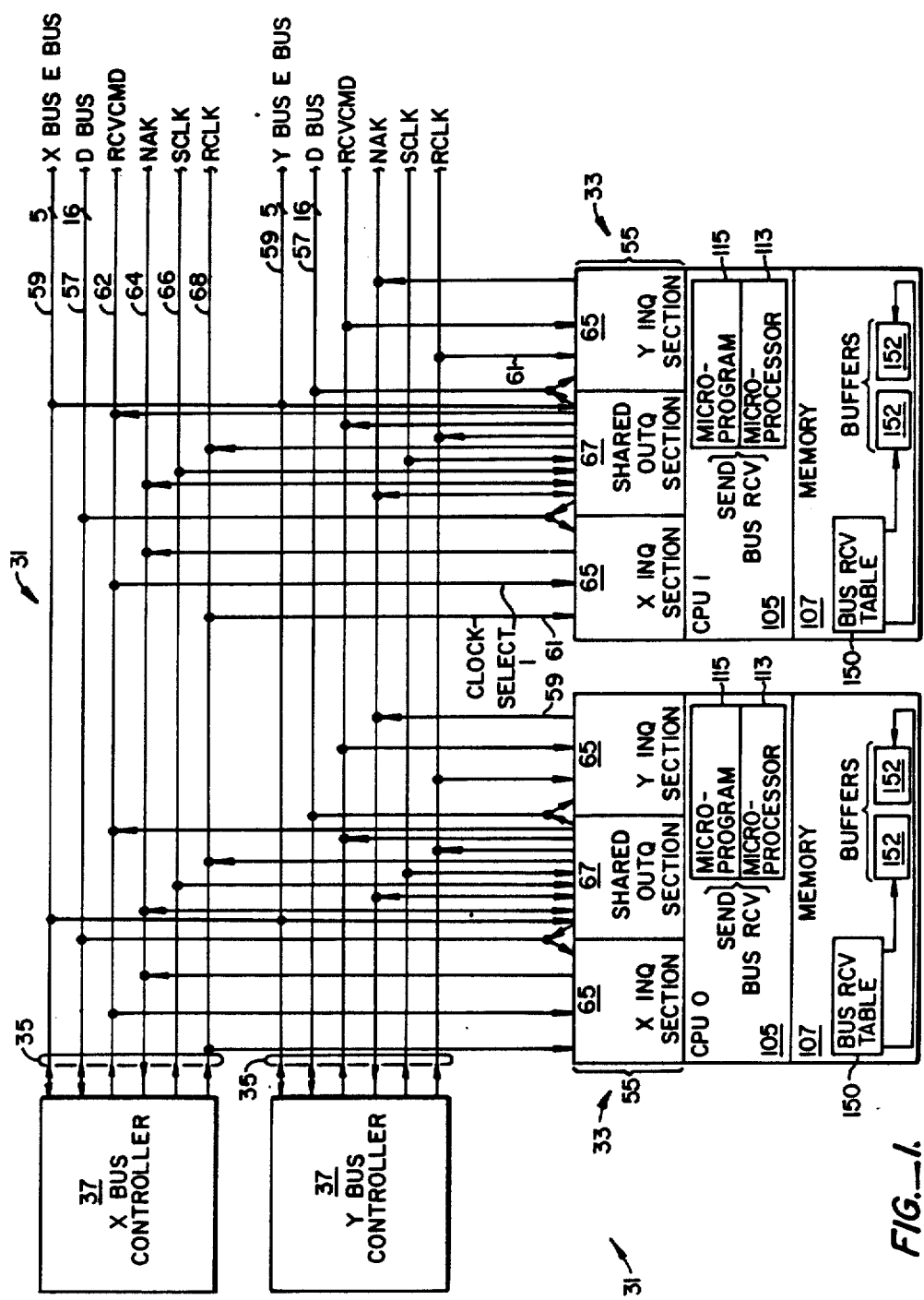
FIG._1.

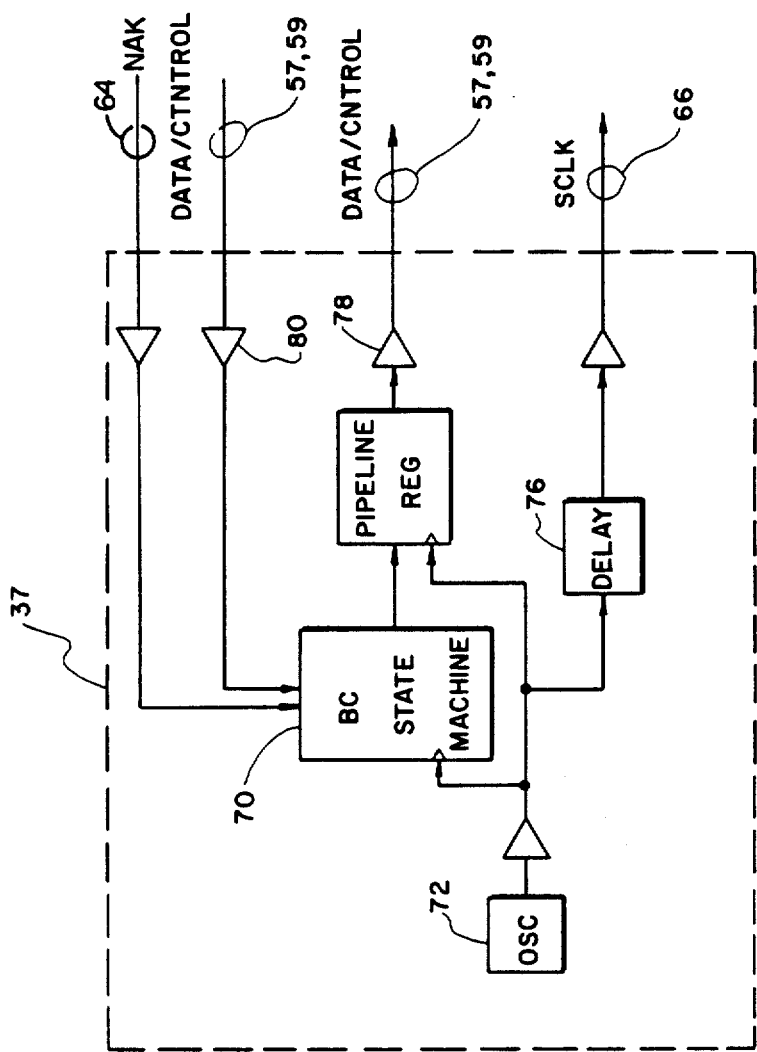
FIG._2.

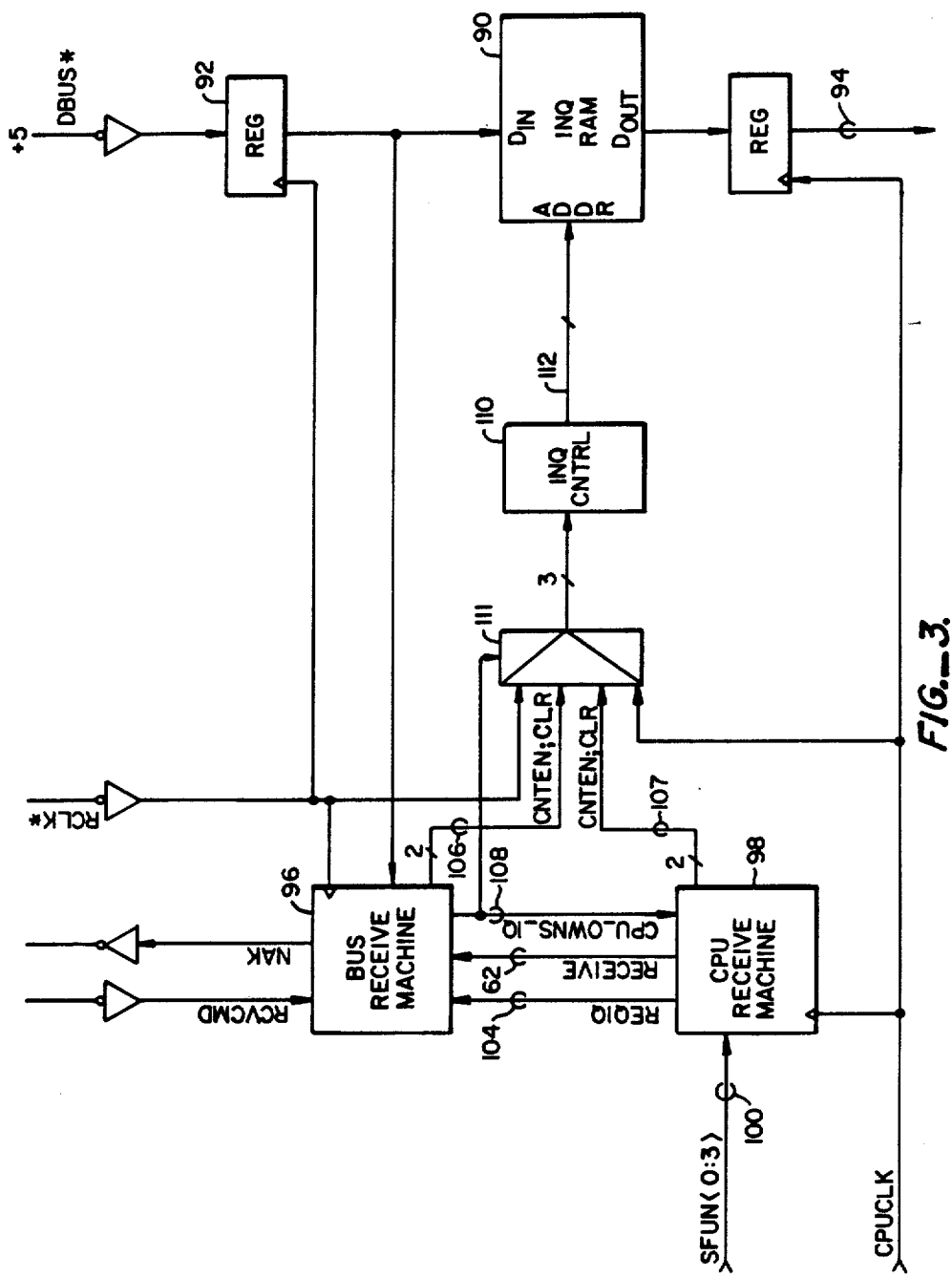

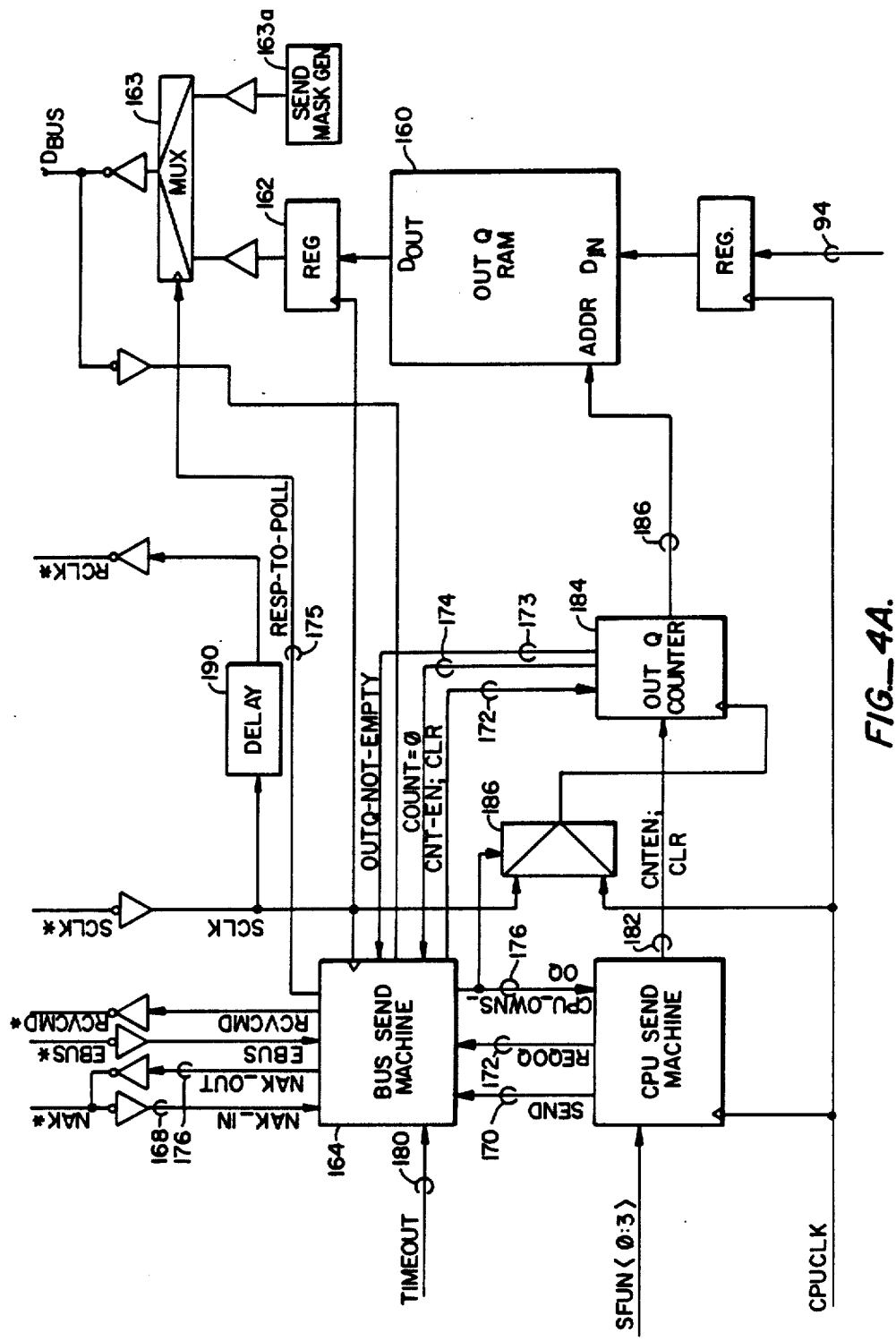
FIG._4A.

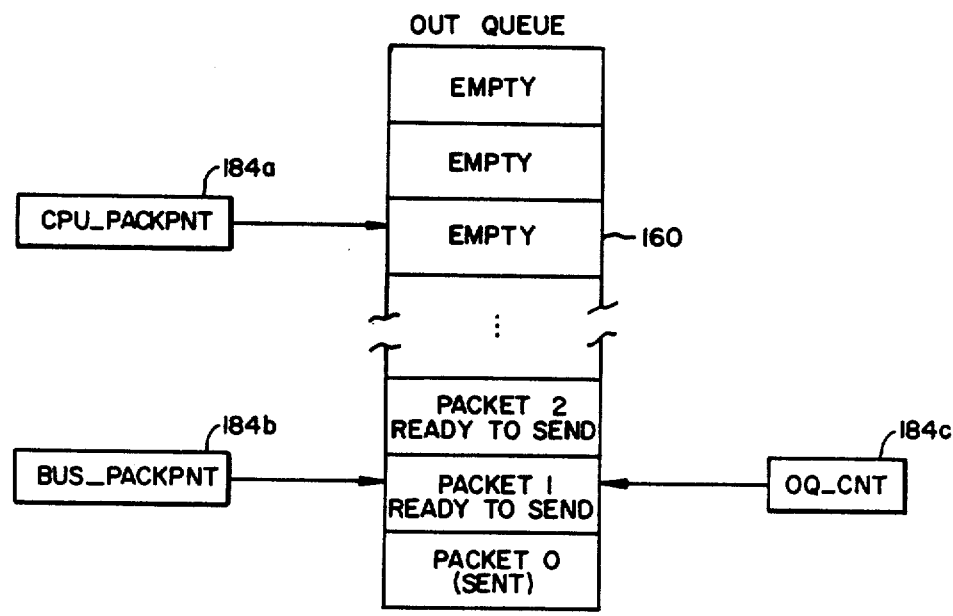
*FIG._4B.*
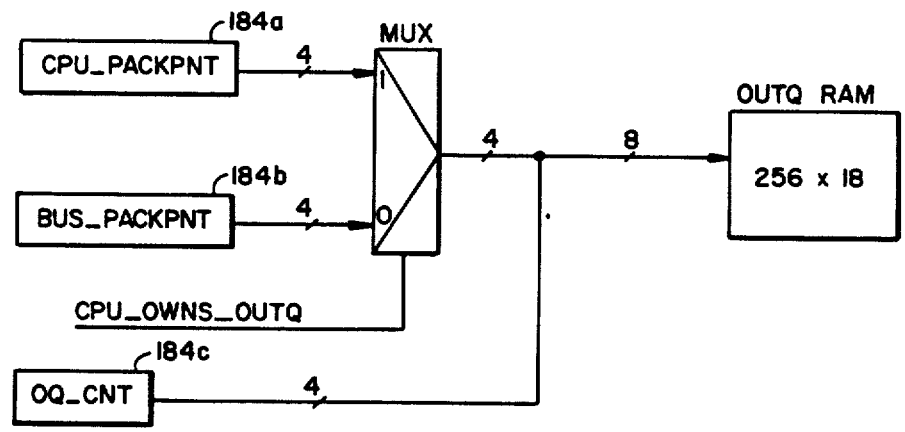
*FIG._4C.*

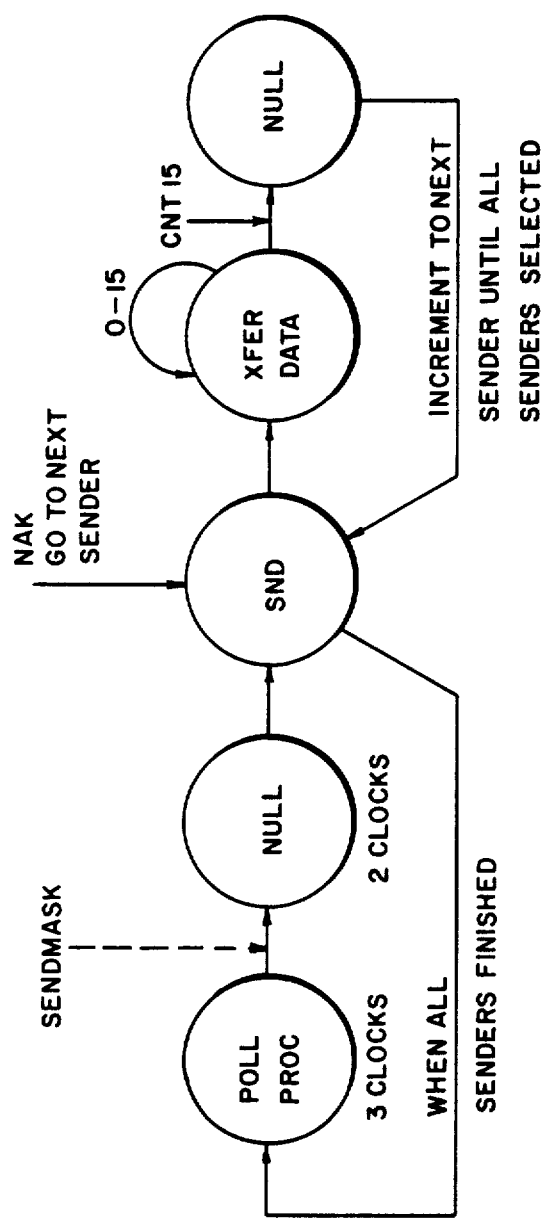
FIG.—5.

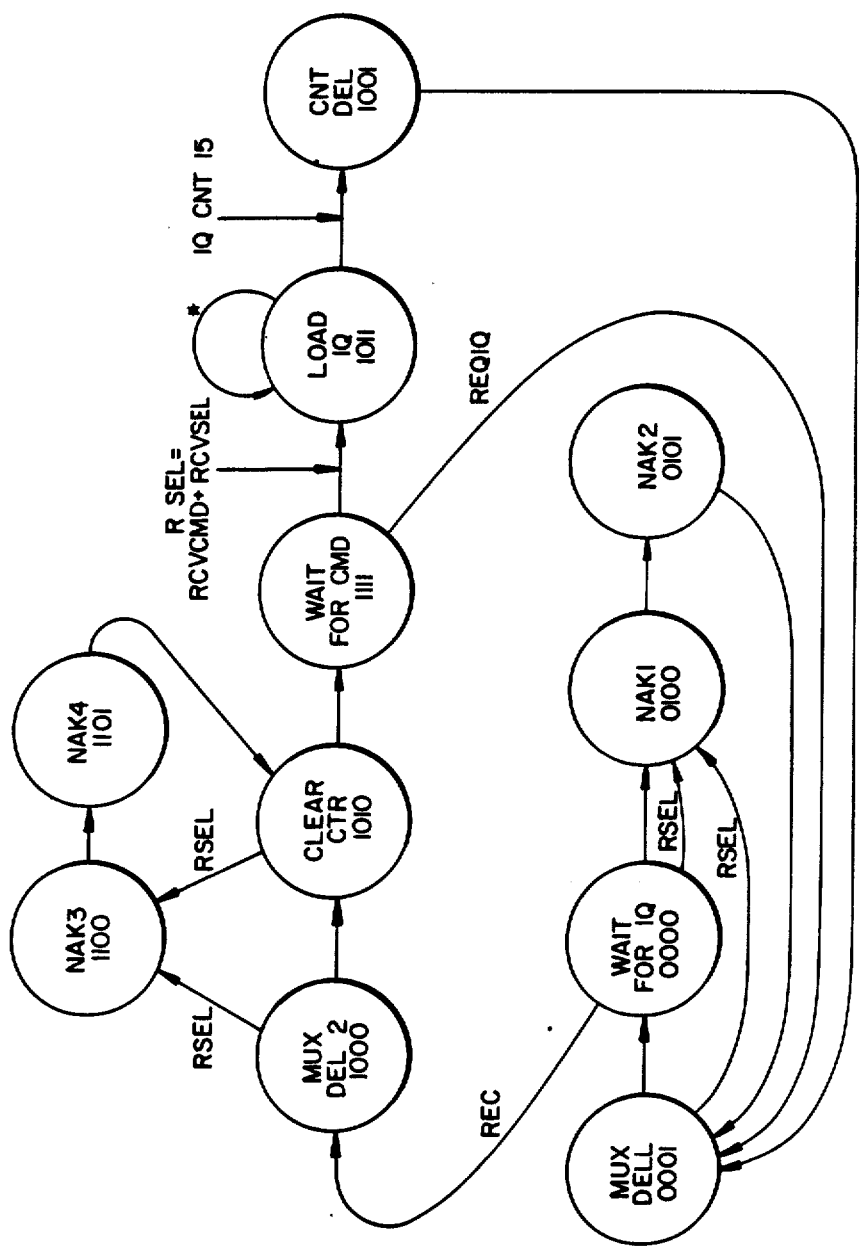
FIG._6.

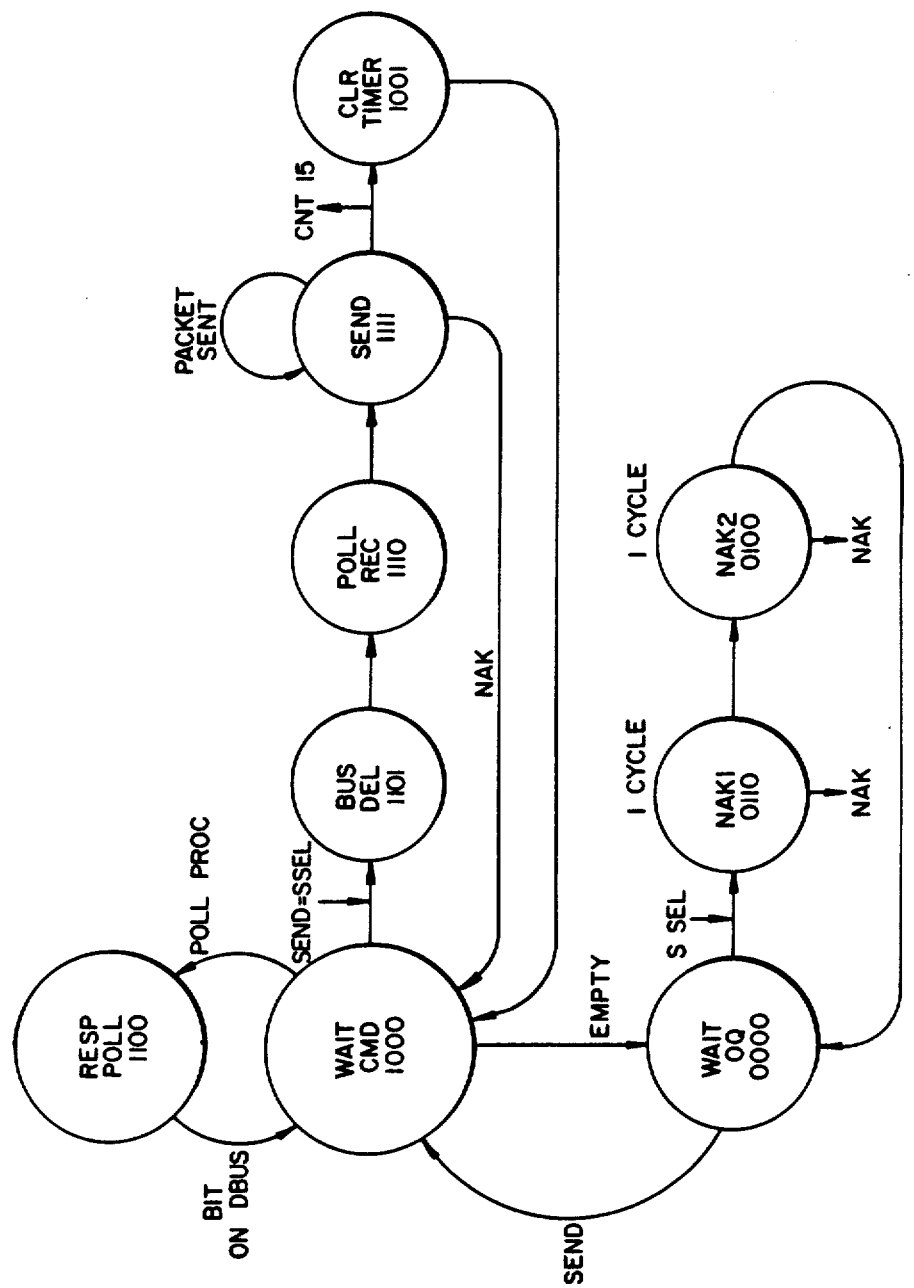
FIG._7.

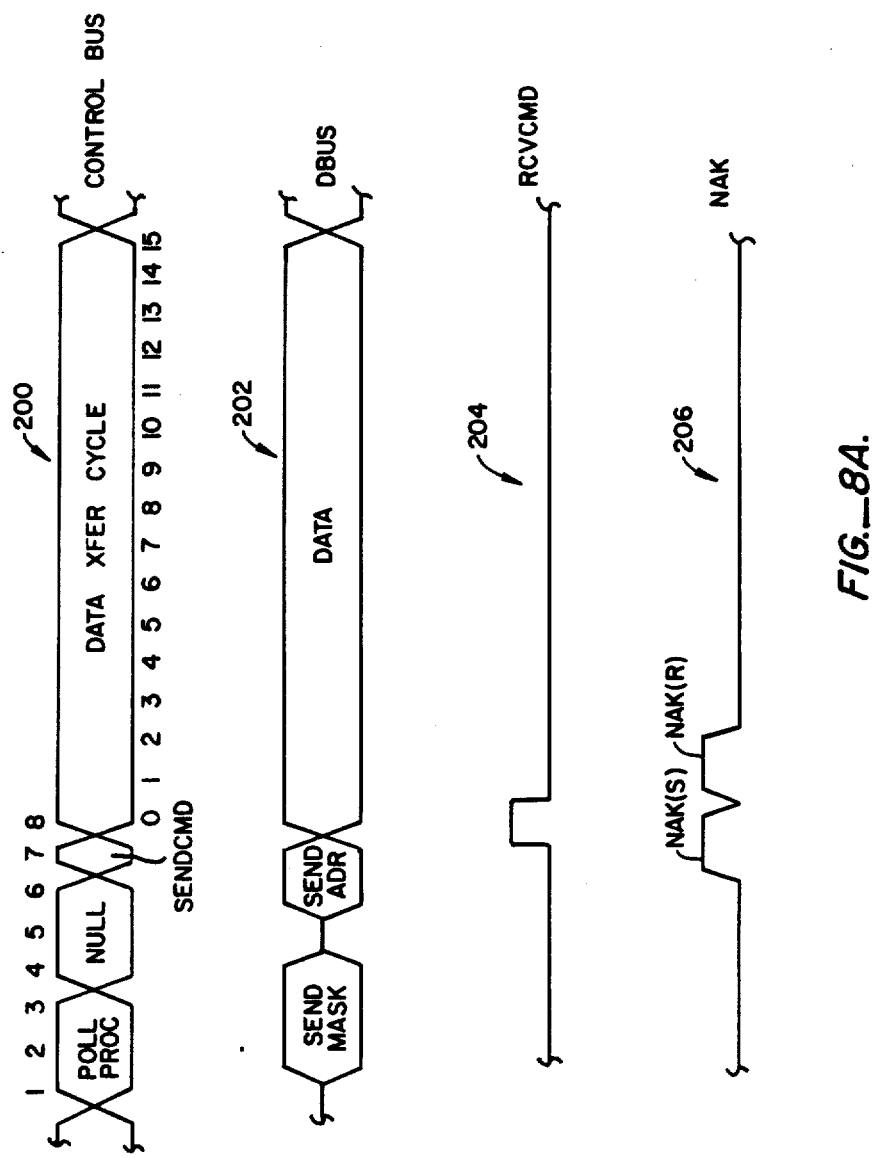
FIG._8A.

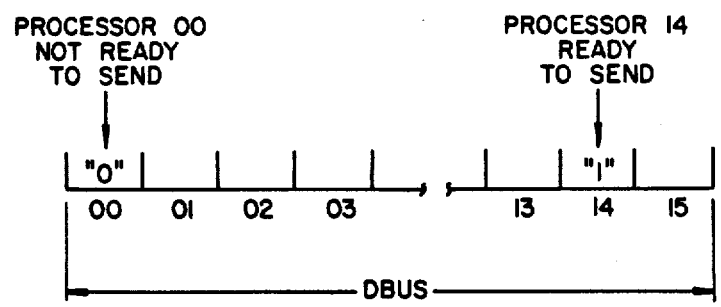
FIG._8B.
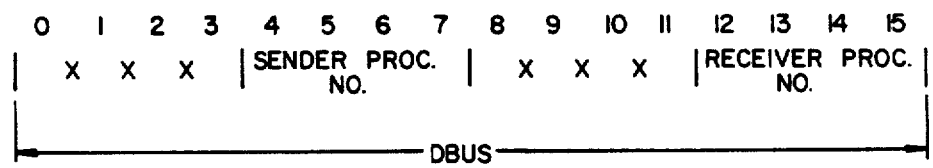
FIG._8C.

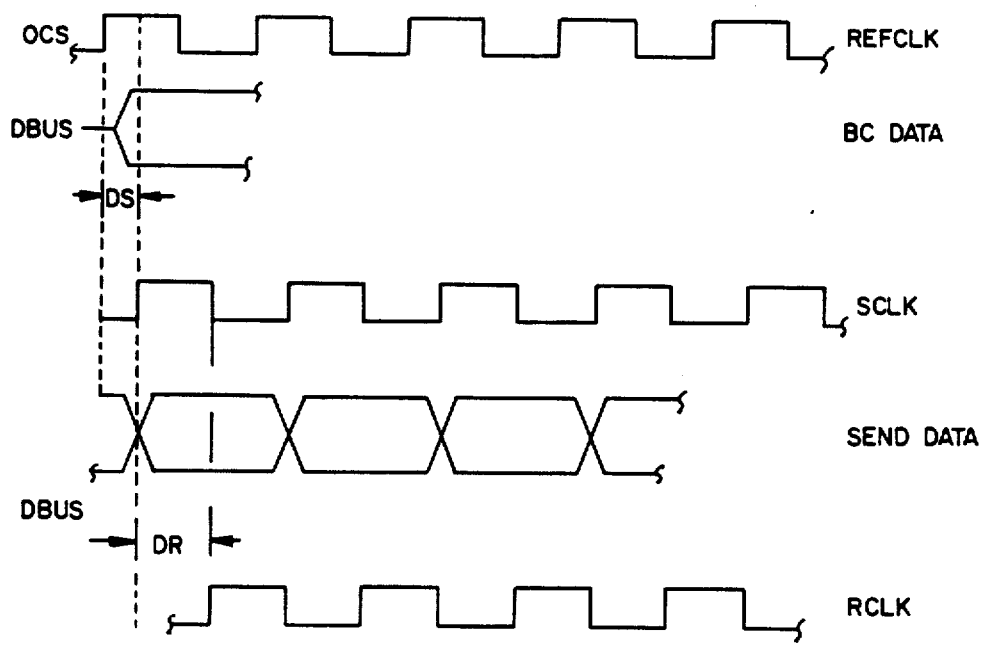
FIG._9.
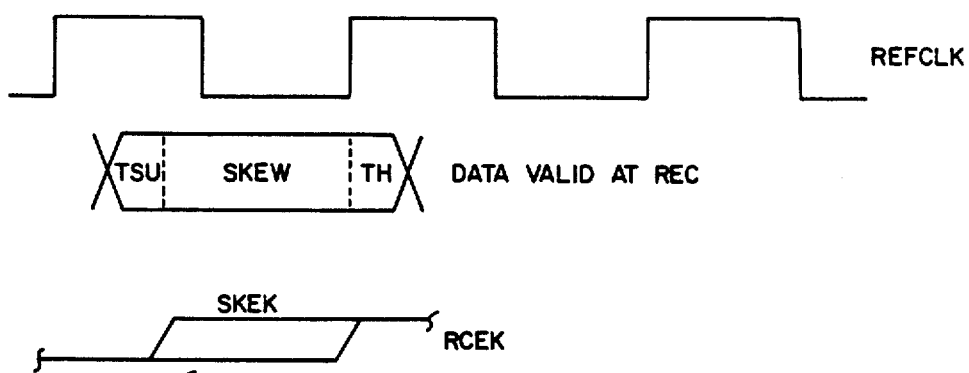
FIG._10.

MULTIPROCESSOR BUS PROTOCOL

BACKGROUND OF THE INVENTION

The present system relates generally to communication between digital processors in a multiprocessor computer system and, more particularly, to a protocol for a multiprocessor bus.

Many digital computer systems are using a plurality of independent processors to perform computer operations. Examples include fault-tolerant modular, and parallel processing systems. These independent processors need to exchange data from time to time, to perform system operations.

Typically data is exchanged between processors on a bus. The protocol of the multiprocessor system controls access by processors to the bus, facilitates the formation of a sender/receiver pair of processors, and provides a timing reference for transferring data from the sender to the bus and from the bus to the receiver.

In many existing systems a dedicated bus controller is coupled to the bus and functions to poll the processors to determine which processors are ready to send data. Typically, the poll for senders sequence is instigated by a processor that is ready to send signalling the bus controller on a dedicated line common to all processors.

The bus controller determines which processors are ready to send by serially polling the processors on dedicated select lines.

In one example of a multiprocessor bus protocol disclosed in U.S. Pat. No. 4,228,496 to Katzman et al., the bus controller then begins a data exchange by enabling the sender. This enablement is accomplished via the individual select line to the sender. The sender then acknowledges if ready. The bus controller enables the receiver via the individual select line to the receiver. If the receiver is ready to receive data, then it signals the bus controller with an acknowledge signal.

In the Katzman system, the bus transfer is synchronized by the system clock. This clock signal is supplied to each processor by individual clock lines. These lines are all the same length so the clock signal arrival times at each processor are not skewed.

The period of system clock signal must be long enough to allow propagation of a signal between processors positioned at opposite ends of the bus and to allow for the bus settling times. Accordingly, the maximum data transfer rate is determined by the length of the bus.

A primary objective of any multiprocessor bus protocol is to provide a high rate of data transfer between processors via the bus. Several aspects of existing protocol systems prevent the attainment of high data transfer rates. First, the requirement of generating a sender request before a poll, sender acknowledges, and receiver acknowledge before a transfer generates bus overhead time. Secondly, the synchronous transfer system requires that data be valid on the entire bus before being transferred to a receiver because the location of the receiver may be anywhere on the bus. Thus, the maximum data transfer rate is determined by the propagation delay of signals propagating the length of the bus.

Additionally, the need to provide separate clock lines, of equal length, and individual select lines to each processor requires a large number of wires to form the bus thereby, increasing the manufacturing complexity and expense of the bus hardware.

SUMMARY OF THE INVENTION

The present invention is a bus protocol system that polls the processors in a continuous, open loop fashion to identify processors ready to send and to sequentially select the ready processors as send processors. The bus system utilizes only bus lines common to all processors. No radial lines are utilized. Thus, less bus lines are utilized than in existing systems, thereby reducing fabrication cost and complexity and increasing reliability.

According to one aspect of the invention, an asynchronous timing system is utilized to transfer a packet of words between a send processor and receiver processor. The words in a packet are strobed onto the bus from the send processor by pulses in a send signal and loaded into the receiver processor by pulses in a receive signal. The receive signal is derived from the send signal at the send processor by delaying the send signal by delay DR.

According to a further aspect of the invention, a bus controller simultaneously polls all processors by asserting a poll signal on a control bus to ascertain which processors are ready to send. A processor ready to send asserts a ready signal on a unique bus line assigned to that processor. The ready signals asserted on the unique bus lines form a send mask.

According to a further aspect of the invention, the bus controller receives the send mask, identifies the processors ready to send, and sequentially selects each of the ready processors as a send processor. The bus controller operates on the assumption that all ready processors will be ready to send a packet when selected. Thus, subsequent to selecting a given ready processor as a send processor the bus controller automatically initiates a complete data transfer cycle to enable the selected processor to transfer a complete packet to the bus.

According to a further aspect of the invention, the selected ready processor generates a negative acknowledge signal to indicate that the selected processor is not ready, when selected. This negative acknowledgement signal is transferred to the bus controller. The bus controller, upon receipt of a negative acknowledge signal, aborts the data transfer cycle for that processor, and selects another one of the ready processors to be send processors.

According to a further aspect of the invention, the bus controller again polls the processors once all the processors responding to the preceding polls have been selected. This polling and selecting process proceeds in an open loop fashion.

The polling system described above is more efficient than existing systems because polling proceeds automatically without needing positive requests for access from the processors and because selection and enablement proceeds automatically without requiring positive ready acknowledgement from the processors. The automatic sequence is only interrupted if a negative acknowledge signal, indicating that a selected processor is not ready to send, is received at the bus controller.

According to a further aspect of the invention, a selected, ready send processor selects another processor to receive its data packet. This packet is automatically transferred to the selected receive processor unless the selected receiver indicates that it is not ready to receive the packet. Again, by obviating the need for a positive ready acknowledge signal the data transfer rate is increased.

According to a further aspect of the invention, the above-described delay, DR, is controlled to have a magnitude equal to about one-half the magnitude of the period of the send signal. Thus, at the send processor the data signals and send pulses are aligned and the receive pulse is positioned midway between the send pulses.

According to a further aspect of the invention, the period of the send signal is controlled to be about equal the sum of the bus skew time and the timing margin at the receiver processor. Existing synchronous bus systems are limited to utilizing a send signal having a period equal to about the sum of the bus propagation time and the timing margin at the receiver. Accordingly, the period of the send signal is smaller, and the data transfer higher, of the present system than of existing systems because the bus skew time is less than the bus propagation time.

Additional features and advantages of the invention will be apparent in view of the drawings and following detailed description.

BRIEF DESCRIPTION OF THE DRAWINGS

FIG. 1 is schematic diagram of a multiprocessor bus system.

FIG. 2 is a schematic diagram of a bus controller 37.

FIG. 3 is a schematic diagram of one IN queue section of the interprocessor control.

FIG. 4A is a schematic diagram of the shared OUT queue section of the interprocessor control.

FIG. 4B is a schematic diagram of the logic for OUT queue addressing.

FIG. 4C is a schematic diagram of the physical circuitry for OUT queue addressing.

FIG. 5 is a state diagram illustrating the operation of the bus controller.

FIG. 6 is a state diagram illustrating the operation of the IN queue section, FIG. 6 shows the state transition diagram for the receive state machine.

FIG. 7 is a state diagram illustrating the operation of the OUT queue section.

FIG. 8A is a timing diagram depicting signal transitions on the E bus, the D bus, the receive command line, and the NAK line.

FIG. 8B is a schematic diagram of the send mask.

FIG. 8C is a schematic diagram of word 00 of a packet.

FIG. 9 is a timing diagram depicting the various clock signals and data transitions.

FIG. 10 is a timing diagram depicting the relative positions of RCLK and a data word at a receiver.

DETAILED DESCRIPTION OF THE PREFERRED EMBODIMENTS

FIG. 1 is schematic diagram of a multiprocessor bus system. Referring now to FIG. 1, the multiprocessor system 31 includes individual processor modules 33. Each processor module 33 comprises a central processing unit 105, a memory 107, and an interprocessor control 55. The individual processor modules 33 are interconnected by interprocessor buses 35 for interprocessor communications.

In the specific embodiment of the multiprocessor system 31 up to sixteen processor modules 33 are interconnected by two interprocessor buses 35 (indicated as the X bus and the Y bus in FIG. 1.)

Each interprocessor bus 35 has a bus controller 37 associated with that bus.

The CPU 105 of each processor 33 includes a host processor 113 and an associated microprogram 115. The bus controllers 37, interprocessor buses 35, and interprocessor controls 55 together with associated host processors 113 and microprograms 115 provide an interprocessor bus system. The construction and operation of this system is described more fully below.

The information transmitted over the bus is transmitted in multiword packets. In a preferred form of the present invention, each packet is a sixteen-word packet in which fifteen of the words are data words.

The control logic within the bus controller 37 and the interprocessor controls 55 of the individual modules 33 follows a detailed protocol. The protocol provides for establishing a sender receiver pair and a time frame for the data packet transfer.

The X bus 35 is identical in structure to the Y bus 35 so that the structure of only one bus will be described in detail. As illustrated in FIG. 1, each bus 35 comprises sixteen individual bus data lines (the D bus) 57, three encoded control lines plus one parity line (the E bus) 59, a receive command (RCVCMD) line 62, a NAK line 64, and two clock lines (SCLK 66 and RCLK 68).

As also illustrated in FIG. 1, the interprocessor control 55 of each processor module 33 includes two IN queue sections 65 (shown as an X IN Q section and a Y IN P section) and a shared OUT queue section 67.

In FIG. 1, each IN queue section 65 has inputs coupled to the D bus 57, RCLK line 68, RCVCMD 62, and an output connected to the NAK line 64 of the respective interprocessor bus 35. The shared OUT queue section 67 has outputs coupled to the D bus 57, the NAK line 64, the RCLK line 68, and the receive command line 62 and inputs coupled to the E bus 59, D bus 57, NAK line 64, and SCLK line 66 of the respective buses.

All of the lines in the data buses 57 are common to all the processor modules 33. There are no radial lines, i.e., dedicated lines from the bus controller 37 to a single processor module 33. The elimination of radial lines reduces the electrical noise, increases the system's reliability, and reduces the system cost.

FIG. 2 is a schematic diagram of a bus controller 37, In FIG. 2, the bus controller 37 comprises a bus control state machine 70, an oscillator 72 coupled to the clock inputs of the bus controller state machine 70, to a bus controller pipeline register 74 clock input and to the SCLK line 66 via a bus controller delay element 76. The output of the pipeline register 74 is coupled to the data and control lines 57 and 59 via an output transceiver 78. The inputs of the bus controller state machine 70 are coupled to the data and control lines 57 and 59 via an input transceiver 80.

FIG. 3 is a schematic diagram of one IN queue section 65 of the interprocessor control 55. In FIG. 3, an IN queue RAM 90 performs a storage function. The IN queue RAM 90 has a data input coupled to the D bus 57 by an IN queue pipeline register 92. A data output of the IN queue RAM 90 is coupled to an SM_SJ bus 94 which transfers data between the IN queue RAM 90, and the main memory 107 of a processor module 33.

The IN queue section 65 includes a bus controlled receive state logic machine 96 and a CPU controlled receive state logic machine 98. The bus controlled receive state logic machine 96 includes a clock input coupled to the RCLK line 68 and the CPU controlled receive stage logic machine 98 has a clock input coupled to the CPUCLK.

The CPU 105 operates on a different clock than the interprocessor bus clock. During the filling of an OUT queue or the emptying of an IN queue in the interprocessor control 55 by the CPU the operation takes place at the CPU clock rate. However, transmission of packets over the interprocessor bus 35 always takes place at the bµs clock rate. In the present system, there are two bus clocks, the SCLK and the RCLK. Both the SCLK and the RCLK are clocked at the same rate, however there is a relative phase difference between the two signals.

The clock input to the pipe line register 92 is also coupled to the RCLK line 68 via a transceiver and clock buffer. Accordingly, both the receive state machine 96 and the pipe line register 92 are clocked by the RCLK signal.

The bus controlled receive state logic machine 96 includes inputs coupled to the RCVCMD line 62, the D bus 57, the RCLK line 68, a RECEIVE line 102, and a CPU-REQIO line 104. The bus controlled receive state logic machine 96 has outputs coupled to a CNT_EN_CLR 106a, the NAK line 64, and a CPU_OWNS_IQ 108.

The CPU controlled receive state logic machine 98 has inputs coupled to an S_FUN bus 100 and the CPU_OWNS_IQ line 108. The CPU controlled receive state logic machine 98 has outputs connected to the RECEIVE line 102, CNT_EN_CLR line 106b, and the CPU_REQIQ line 104. An IN queue counter INQ CNT 110 has inputs coupled to the CNT_EN_CLR lines 106a and 106b via MUX 111 and an output coupled to an address bus 112. The control input of MUX 111 is coupled to the CPU_OWNS_IQ line 108. The address bus 112 is coupled to the address input of the IN queue RAM 90.

Each IN queue RAM 90 is a sixteen word deep buffer for storing one packet. Addressing of each IN queue RAM 90 is straight forward using the four bit INQ CNT 110 to generate the word address. The INQ CNT 110 is automatically incremented whenever the bus writes to the IN queue RAM 90 and whenever the processor reads from or writes to the IN queue RAM 90.

FIG. 4A is a schematic diagram of the shared OUT queue section 67 of the interprocessor control 55. Referring to FIG. 4A, an OUT queue RAM 160 has its data output coupled to the D bus 57 via an OUT queue pipeline register 162 and MUX 163. A send mask generator 163a is coupled to the D bus 57 via MUX 163. The data input port of the OUT queue RAM 160 is coupled to the SM_SJ bus 94. A bus controlled send state machine 164 has its clock input coupled to the SCLK line 66 and a CPUCPU controlled send state machine 166 has its clock input coupled to the CPUCLK. The clock input of the OUT queue pipeline register 162 is coupled to SCLK via a transceiver and clock buffer.

The bus controlled send state machine 164 has inputs coupled to a NAK_IN line 168, the E bus 59, the D bus 57, a SEND line 170, REQ_OQ line 172, an OUT-Q_NOT_EMPTY line 173, a TIMEOUT line 180 and a COUNT=φ line 174. The bus controlled send state machine 164 has outputs coupled to an NAK_OUT line 176, the D bus 57, the RCVCMD line 62, a CPU_OWNS_OQ 177, a CNT_EN_CLR line 178, and a RESPOND_TO_POLL line 179.

The CPU controlled send state machine 166 has inputs coupled to the S_FUN bus 100 and the CPU_OWNS_OQ line 177. The CPU controlled send state machine 166 has outputs coupled to the SEND line 170, REQ_OQ line 172 and to a CNT_EN_CLR line 182.

An OUT queue INT 184 has inputs coupled to the CNT_EN_CLR lines 178 and 182 and to SCLK and CPUCLK via MUX 186. The control input of MUX 186 is coupled to the CPU_OWNS_OQ line 177. An address bus 187 is coupled to the ADDR input of the OUT queue RAM 160. Each OUT queue section 67 further includes an RCLK generating circuit comprising an OUT queue DELAY element 190 having an input coupled to the SCLK line 66 and an output coupled to the RCLK line 68.

FIGS. 4B and 4C depict logical and physical implementations of the OUT queue addressing counter 184 and OUT queue RAM 160. Referring to FIG. 4B, the OUT queue RAM 160 consists of a single memory array 256 words deep by sixteen bits wide (plus two parity bits). The OUT queue RAM 160 is capable of storing up to sixteen packets of sixteen words each. The addressing logic for this array implements a circular queue. The bus removes packets from the bottom of the queue and the processor adds packets to the top of the queue. Referring now to FIG. 4C, three counters, CPU_PACKPNT 184a, BUS_PACKPNT 184b, OQ_CNT 184c, are utilized to generate addresses for the OQ RAM 160.

CPU_PACKPNT 184a points to the next free packet location within the queue. It provides the upper four bits of the address when the processor reads or writes the OUT queue RAM 160. This counter can be cleared using a RESET micro-operation and can be incremented using a NEXT micro-operation.

The BUS_PACKPNT counter 184b points to the next packet waiting to be sent on the bus. It provides the upper four address bits of the OUT queue when the bus state machine 70 reads from the queue. This counter is cleared with the RESET micro-operation. It is automatically incremented after a packet is sent.

The counter OQ_CNT 184c provides the low order four address bits for the OUT queue and thus points to a word within a packet. This counter is reset using the RESET micro-operation or using a RESET COUNT microoperation. OQ_CNT 184c is automatically incremented whenever a word is written to or read from the OUT queue RAM 160. After sixteen reads or writes, this counter will wrap around to zero. Thus, the seventeenth word of a packet is the same as the first word.

FIGS. 5, 6, and 7 are state diagrams illustrating the operation of the bus controller 37, the IN queue section 65, and the OUT queue section 67.

In each figure, the solid lines with arrows indicate transitions from the present state to the next state. Dashed lines with arrows ending on the solid lines with arrows indicate conditions that must be satisfied for the indicated transitions to take place.

FIG. 8 is a timing diagram depicting signal transitions on the E bus 59, the D bus 57, the RCVCMD line 62, and the NAK line 64.

The following is a description of the system protocol for a successful transfer of packet between the processors 33 depicted in FIG. 1. For a successful transfer to take place, the IN queue RAM 90 is empty, the bus controlled receive state machine 96 is in the WAIT_FOR_CMD state, the OUT queue RAM 160 is full, the bus controlled send state machine 164 is in the WAIT_FOR_CMD state, and the bus controller state machine 70 is in the POLL_PROC state.

During the transfer the bus controller state machine (BC) 70 transmits encoded signals on the E bus 59 and the D bus 57. Table 1 lists the names of these encoded signals, the signal code, and gives a brief description of the function of each coded signal (the * indicates that data is low asserting). Table 2 lists the state transitions for the receive state machine, and Table 3 lists the state transitions for the send state machine.

TABLE 1

DATA  (00:15)*
   These sixteen lines carry the interprocessor bus
   (IPB) data with DATA(00) being the most
   significant bit.
CNTL  (0:2,P)*
   These encoded control lines are asserted only by
   the BC. In the following description, a "1" means
   that the signal is asserted, while a "0" means
   that the signal is not asserted. Note that the
   signals are low asserting. CNTL(P)* is odd parity
   for the three control lines.
000,1   - NULL
   The BC will assert this command to indicate that
   nothing is happening on the bus. It is useful to
   allow for propagation delays during polling cycles.
001,0   - (reserved)
100,0   - Data_XFER
   The BC asserts this command to indicate that a
   data transfer is in progress.
101,1   - RESET
   The BC can assert this command to reset the sending
   state machines on each of the processors. The
   reset of the state machines is synchronous with
   SCLK.
110,1   - POLL_PROC
   When this command is asserted by the BC, each processor
   that has a packet to send will assert the
   data line corresponding to its processor number,
   thus forming the SEND MASK.
111,0   - SNDCMD
   The BC asserts this command along with a processor
   number on DATA(04:07) and DATA(12:15) to select a
   processor to send.

TABLE 2
RECEIVE Machine State Transition Table

Inputs to machine
   CPU_REQIQ
   R_SELECT = RCVCMD & RCVSEL
   RECEIVE
   IQ_CNT15
   RCLK State Transition Table

| Name | Current State | Input | Next State |
|---|---|---|---|
| MUX_DEL 1 | 0001 | x0xx | 0000 |
|  | 0001 | x1xx | 0100 |
| WAIT_FOR IQ | 0000 | x00x | 0000 |
|  | 0000 | x01x | 1000 |
|  | 0000 | x10x | 0100 |
|  | 0000 | x11x | 0100 |
| NAK1 | 0100 | xxxx | 0101 |
| NAK2 | 0101 | xxxx | 0001 |
| MUX_DEL 2 | 1000 | x0xx | 1010 |
|  | 1000 | x1xx | 1100 |
| CLEAR_CNT | 1010 | x0xx | 1111 |
|  | 1010 | x1xx | 1100 |
| NAK3 | 1100 | xxxx | 1101 |
| NAK4 | 1101 | xxxx | 1010 |
| WAIT_FOR_CMD | 1111 | 00xx | 1111 |
|  | 1111 | 01xx | 1011 |
|  | 1111 | 10xx | 0001 |
|  | 1111 | 11xx | 1011 |
| LOAD IQ | 1011 | xxx0 | 1011 |
|  | 1011 | xxx1 | 1001 |
| CNT DEL | 1001 | xxxx | 0001 |
| Transitions From Unused States |  |  |  |
|  | 0010 | xxxx | 0000 |
|  | 0011 | xxxx | 0010 |
|  | 0110 | xxxx | 0100 |
|  | 0111 | xxxx | 0110 |
|  | 1110 | xxxx | 1111 |

TABLE 3
SEND State Machine Transition Table

Inputs to Machine
CPU_REQOQ
S_SELECT = SNDCMD & SNDSEL
EMPTY
TIMEOUT
POLL_PROC
SEND
NAK_IN
CNTO State Transition table for SEND State Machine

| Name | Current State | Input | Next State |
|---|---|---|---|
| WAIT_FOR_OQ | 0000 | x0xxx0xx | 0000 |
|  | 0000 | x0xxx1xx | 1000 |
|  | 0000 | x1xxx0xx | 0110 |
|  | 0000 | x1xxx1xx | 0110 |
| NAK1 | 0110 | xxxxxxxx | 0100 |
| NAK2 | 0100 | xxxxxxxx | 0000 |
| WAIT_FOR_CMD | 1000 | 00000xxx | 1000 |
|  | 1000 | 10xxxxxx | 0000 |
|  | 1000 | xx1xxxxx | 0000 |
|  | 1000 | 0x01xxxx | 1000 |
|  | 1000 | 1x01xxxx | 0000 |
|  | 1000 | 0x00xxxx | 1000 |
|  | 1000 | 1100xxxx | 0000 |
|  | 1000 | 00001xxx | 1100 |
|  | 1000 | 01001xxx | 1000 |
|  | 1000 | 11001xxx | 0000 |
|  | 1000 | x1000xxx | 1101 |
| RESPOND_TO_POLL | 1100 | xxxx0xxx | 1000 |
|  | 1100 | xxxx1xxx | 1100 |
| BUS_DEL | 1101 | xxxxxxxx | 1110 |
| POLL_RCVR | 1110 | xxxxxxxx | 1111 |
| SEND | 1111 | xxxxxx00 | 1111 |
|  | 1111 | xxxxxx01 | 1001 |
|  | 1111 | xxxxxx10 | 1000 |
|  | 1111 | xxxxxx11 | 1000 |
| CLR_TIMER | 1001 | xxxxxxxx | 1000 |
| Transitions from Unused States |  |  |  |
|  | 0001 | xxxxxxxx | 1000 |
|  | 0011 | xxxxxxxx | 1000 |
|  | 0010 | xxxxxxxx | 0100 |
|  | 0101 | xxxxxxxx | 1110 |
|  | 0111 | xxxxxxxx | 1000 |
|  | 1011 | xxxxxxxx | 1000 |
|  | 1010 | xxxxxxxx | 0111 |

TABLE 2-continued
RECEIVE Machine State Transition Table

| | | |
|---|---|---|
| 0111 | xxxx | 0110 |
| 1110 | xxxx | 1111 |

Referring now to FIGS. 5–8 and Tables 1–3, the bus controller state machine asserts the POLL PROC signal on E bus 59 for clock cycles 1–3. This POLL PROC signal is received by the bus controlled SEND state machine 164 and causes the transition from the WAIT_FOR_CMD state to the RESPOND_TO_POLL state.

The bus controlled send state machine 164 then determines whether there is a packet stored in the OUT queue RAM 160 ready to send. If the packet is ready to send then the bus controlled send state machine 164 controls the state of the RESP_TO_POLL signal on line 179 to cause MUX 163 to couple the send mask generator 163a to the D bus 57. The send mask generator 163a asserts a signal on a unique line of the D bus 57 assigned to that particular processor to indicate that the processor is ready to send. A "0" on a particular line indicates that the processor associated with that line is not ready to send. A "1" on a particular line indicates that the processor associated with that line is ready to send. If a packet is not ready, then the send state machine 164 controls the state of the RESP_TO_POLL signal on line 179 to cause MUX 163 to couple the register 162 to the D bus 57. The register 162 asserts a signal on the unique lines of the D bus 57 indicating that the processor is not ready to send. As described above, the D bus includes sixteen individual lines with each one of these lines assigned to a given one of the sixteen processors coupled to the bus. Accordingly, a send mask is generated where the data lines assigned to processors ready to transmit are asserted and those data lines assigned to processors not ready to transmit are deasserted. This send mask is asserted on the data bus for clock cycles 2-4, as indicated on graph 202 of FIG. 8A. The send mask is depicted in FIG. 8B. The send mask is received at the bus controller 37. The bus controller 37 advances from the POLL_PROC state to the NULL state for clock cycles 4-6, as shown by 200 of FIG. 8A. During the NULL state the bus control state machine 164 reads the send mask and determines which processors are ready to send data. The bus controller 37 then advances to the SEND state and generates the SNDCMD signal on the E bus.

Additionally, the bus controller 37 selects one of the ready processors as a send processor by asserting the address of the selected send processor on the D bus during clock cycles 6 and 7, as depicted in line 202 of FIG. 8A. The send processor state machine, identified by the address asserted on the D bus, makes transitions to the BUS_DEL state, allowing the bus to settle for one clock cycle, and then to the POLL_RCVR state.

In the POLL_RCVR state, the send processor transfers the first word (word 00) in the OUT queue RAM 160 onto the D bus, as depicted on line 202 of FIG. 8A. The format of word 00 of the packet is depicted in FIG. 8C. Simultaneously, the bus controlled state machine 164 advances from the SEND state to the DATA_XFER state and asserts the data transfer signal on the E bus, as depicted at 200 in FIG. 8A. Thus, the bus controller 37 has granted the send processor access to the bus. If the send processor is not ready to send, it asserts an NAK signal on NAK line 64 to indicate to the bus controller 37 that it is not ready. The bus controller 37 automatically remains in the DATA_XFER state for a complete DATA_XFER cycle unless an NAK signal is received. In that event, the transfer from the send processor is aborted. The bus controller 37 asserts the SNDCMD state and selects a different ready processor to be a send processor. If no NAK signal is received, the send processor asserts the RCVCMD line 62 during this clock cycle and continues to drive the D bus 57 with the first word of the data packet. The receive state machine 96 then advances from the WAIT_FOR_CMD state to the LOAD_IQ state.

At clock cycle 9, the IN queue counter 110, the OUT queue counter 184, and a counter (not shown) in the bus control state machine 70 begin to count sixteen cycles, (COUNT 00 to COUNT 15). The IN queue counter 110 and OUT queue counter 184 span the address space of the IN queue and OUT queue RAMs 90 and 160, respectively. The words in the packet from the OUT queue RAM 160 are transferred to the D bus and the words are clocked into the IN queue RAM 90 according to an SCLK/RCLK timing scheme to be described more fully below. At the end of the sixteen cycles the count 15 output from the counters causes the bus control state machine 70 to advance from the DATA_XFER state to the NULL state, the bus controlled send state machine 164 to advance from the SEND state to the CLR_TIMER state, and the bus controlled receive state machine 96 to advance from the LOAD_IQ state to the CNT_DEL state. These null, clear and delay states allow the bus to settle before the transmission of another packet.

Subsequently, the bus control state machine 70 returns to the SEND state and places the address of the next processor ready to send onto the D bus. The above-described cycles continue for each processor ready to send until all processors have transmitted their packets. The bus control state machine then makes the transition from the SEND state to the POLL_PROC state and repeats the above-described process.

Thus, a data transfer consists of a first processor sending one sixteen word packet of data to a second processor. The transfer is initiated when the bus controller selects a first processor to send after the processor has responded to the general poll. The bus controller selects a processor to send by asserting the code for SEND on the E bus and asserting the address of the first processor on data lines 04 through 07 and the address of the second processor, designated to receive, on data lines twelve through fifteen of the D bus, as shown in FIG. 8C. If the first processor is not ready to send, it will assert an NAK signal for two cycles and ignore the selection. Upon receiving the NAK signal, the bus controller will abort the sender selection and will proceed to select the next sender in the sequence. If the first processor is ready to send, it will assert the RCVCMD line and the first word of the packet in its OUT queue onto the D bus. The first word in the packet contains the address of the second, or receiver processor and the combination of RCVCMD and the first word in the packet uniquely selects a processor to receive. If the second processor is not ready to receive the packet, it will assert an NAK signal for two cycles. When the first processor receives the NAK signal it will abort its current data transfer and will wait in the WAIT_FOR_CMD state for the next general poll from the bus controller. The bus controller, upon receiving the NAK signal, will assume that the transfer was unsuccessful and will abort the current transfer. The bus controller will then select the next sender in the sequence. Note that both the first processor and the bus controller must monitor the NAK line 64.

If the second processor is able to receive the packet, however, it will clock the data into its IN queue using the active edge of the RCLK, as described below. After it has read the packet, the second processor will become unavailable to receive until its IN queue RAM is emptied by the host CPU.

These data transfers operate in an open loop fashion in that if the first processor does not receive an NAK signal it will assume that the transfer was successful. This open loop operation allows the bus protocol to operate more efficiently than would be possible if a positive acknowledgement were required.

Each receive state machine actually consists of two interlocked state machines. One of the machines 98 is clocked (or controlled) by the processor clock and responds to the micro-operation commands. The other machine 96 is clocked (or controlled) by RCLK and responds to commands from the bus as well as commands from the processor clocked machine 98. Commands between the two machines are doubly synchronized. FIG. 6 shows the state transition diagram for the receive state machine.

The bus clocked receive state machine 96 arbitrates the ownership of the IN queue between the host processor and the bus. If this machine is in the MUX__DEL__1, WAIT__FOR__IQ, NAK1, or NAK2 states, the queue is owned by the host processor. If this machine is in any other state, the queue is owned by the bus.

With reference to FIG. 6, assume the bus clocked receive state machine 96 is in the WAIT__FOR__IQ state. If another processor tries to select this processor as a receiver while it is in this state, the machine will assert the NAK signal for two cycles. Asserting the NAK signal causes the sending processor to abort its transfer.

When the host processor has emptied the IN queue and is ready to receive another packet, it will execute the GIVE__IQ micro-operation. This operation will cause the processor clocked receive sate machine 98 to advance from the IDLE state to the RECEIVE state (not shown in the FIGS.). This transition then will cause the bus clocked receive state machine 96 to transition from the WAIT__FOR__IQ state to the MUX__DEL2 state. The MUX__DEL2 state will then cause the processor clocked receive state machine 98 to transition back to the IDLE state to wait for the next micro-operation command. From the MUX__DEL2 state, the bus clocked receive state machine 96 transitions to the WAIT__FOR__CMD state through the CLEAR__CNT state. The bus clocked receive state machine 96 will assert an NAK signal for two clock cycles if the processor is selected to receive while the machine is in the MUX__DEL2 or CLEAR__CNT states.

While the bus clocked receive state machine 96 is in the WAIT__FOR__CMD state, the IN queue is owned by the bus. The host processor can regain ownership of the IN queue by executing the CPU__REQIQ micro-operation. This command causes the processor clocked receive state machine 98 to transition to its WAIT__FOR__IQ state. This state then causes the bus clocked receive state machine 96 to transition to its WAIT__FOR__IQ state, via its MUX__DEL1 state, with the processor now owning the IN queue. The processor clocked receive state machine 98 then returns to its IDLE state.

From the WAIT__FOR__CMD state, the bus clocked receive state machine 96 will transition to the LOAD__IQ state when it is selected to receive by another processor on the bus. It will remain in the LOAD__IQ state until it has loaded sixteen words in to the IN queue. It then transitions to its WAIT__FOR__IQ state through the CNT__DEL state, and the MUX__DEL1 state, thereby giving ownership of the IN queue back to the host processor. The CNT__DEL state assures that the enable inputs to the IN queue address counter are deasserted before switching its clock input.

The send state machine actually consists of two interlocked state machines. One machine 166 is clocked (or controlled) by the processor clock and responds to the micro-operation commands. The other machine 164 is clocked (or controlled) by the SCLK from the bus and it controls the actual signals on the bus. Signals between the two machines are doubly synchronized with the appropriate clock.

Ownership of the OUT queue is controlled by the bus clocked send state machine 164. The OUT queue is owned by the host processor whenever the bus clocked send state machine 164 is in the WAIT__FOR__OQ, NAK1, or NAK2 states. If it is in any other state, the OUT queue is owned by the bus. Packets can be sent only when the OUT queue is owned by the bus and the processor can manipulate the OUT queue only when it owns the OUT queue.

With reference to FIG. 7, assume the bus clocked send state machine 164 is in the WAIT__FOR__CMD state. If it receives a POLL PROC command from the bus controller, and the OUT queue is not empty, and the time has not expired, then it will transition to the RESPOND__TO__POLL state. In this state, it will drive its poll mask onto the bus until the POLL PROC command is deasserted by the bus controller. The bus clocked send state machine 164 then will return to the WAIT__FOR__CMD state to wait for another command.

From the WAIT__FOR__CMD state, the bus clocked send state machine 164 will transition to the states to send a packet only if it is selected to send by the bus controller 37, and the OUT queue is not empty, and the timer has not expired. The BUS__DEL state allows one bus cycle for propagation delays on the bus as a new send processor (i.e., this one) begins to drive the bus. The receiving processor is selected in the POLL__RCVR state. Assuming that the receiver is ready, the bus clocked send state machine 164 begins to send the rest of the packet. If an NAK signal is asserted at any time during the send process, for example from the receiver processor, the send processor aborts the sending of the packet by returning to the WAIT__FOR__CMD state. If all of the words are sent without an NAK signal being asserted, however, the send processor assumes that the send was successful. From the SEND state, the bus clocked send state machine 164 advances to the CLR__TIMER state, it then clears the send timer and increments BUS__PACKPNT to point to the next packet in the OUT queue.

The bus clocked send state machine 164 will respond to an ownership request from the host processor only when it is in the WAIT__FOR__CMD state. If such a request is made, the bus clocked send state machine 164 will transition to the WAIT__FOR__OQ state and give the ownership of the OUT queue to the host processor. If the bus clocked send state machine 164 is selected to send while it is in the WAIT__FOR__OQ state, the NAK signal will be asserted for two clock cycles. This asserting of the NAK for two clock cycles will cause the bus controller 37 to abort its selection of this sender. When the host processor is finished with the OUT queue, it will give the OUT queue to the bus clocked send state machine 164 by causing it to transition to the WAIT__FOR__CMD state. From this state, the bus clocked send state machine 164 can begin sending its packet. When the OUT queue becomes empty, the bus clocked send state machine 164 enters the WAIT__FOR__OQ state. Thus, ownership of the OUT queue is given to the host processor when the OUT queue is empty.

The bus RESET command from the bus controller 37 has a slightly different effect on the bus clocked send state machine 164 depending upon the OUT queue ownership. If the processor owns the OUT queue, a bus RESET command forces the bus clocked send state machine 164 into the WAIT__FOR__OQ state. However, if the bus owns the OUT queue, a bus RESET command forces the bus clocked send state machine 164 into the WAIT__FOR__CMD state.

The above-described protocol does not require positive acknowledgement from a selected processor prior to initiating a data transfer or send cycle. Instead, the protocol automatically initiates these cycles unless a negative acknowledge (NAK) indicates that a selected processor is not ready to perform a desired function. Utilizing this negative acknowledge system reduces the overhead associated with the protocol and increases the data transfer rate of the system.

The aspect of the system protocol relating to establishing a timing reference for transferring the words in a first processor (sender) to the bus and transferring words on the bus to a second processor (receiver) will now be described.

FIG. 9 is a timing diagram depicting the various clock signals and data transitions. Referring to FIG. 9, REFCLK 300 is the output of the bus controller oscillator 72. Both SCLK 302 and RCLK 304 are derived from REFCLK 300, thus both have the same frequency but different relative phases.

The leading edge of each SCLK pulse is delayed relative to the leading edge of the corresponding REFCLK pulse by a time delay DS produced by the bus controller delay element 76 (FIG. 2) and delays induced by other circuit components.

Similarly, the leading edge of RCLK 304 is delayed relative to the leading edge of SCLK 302 by the quantity DR produced by the delay element 190 (FIG. 4A) and the delays introduced by other circuit elements.

As depicted in FIG. 4A, SCLK is input to the send processor on SCLK line 66 and is utilized as a strobe to clock data from the OUT queue pipeline register 162 of the send processor onto the D bus 57. The RCLK signal is generated at the send processor by transmitting SCLK through the delay element 190 onto the RCLK line 68.

Referring back to FIG. 3, RCLK is input to the receive processor on RCLK line 68 and is utilized as a strobe to clock data from the D bus 57 into the IN queue pipeline register 92 of the receive processor.

Referring again to FIG. 9, successive words in the packet are transferred from the OQ pipeline register 162 of the send processor upon receipt of the leading edge of the SCLK pulses. Thus, each data word cycle time is equal to the period of the SCLK cycles. The leading edge of each data word cycle is aligned with the leading edge of the SCLK pulse.

Each word transferred to the bus consists of a set of high or low voltage level signals asserted on the individual lines of the D bus 57. Each component in the transmission path between the send and receive processors delays the propagation of these signals. In particular, the bus propagation delay time (Tbus) introduced by the D bus 57 itself is dependent on the length of the bus between the send and the receive processors.

In the present system, a transfer between any two processors 33 may take place. Thus, the quantity Tbus may vary from Tbus max (send and receive processors at opposites ends of the bus) to Tbus min (send and receive processors adjacently positioned on the bus).

The signal RCLK is generated and phased relative to the data word cycle at the send processor. The quantity DR is selected so that the leading edge of the RCLK pulse arrives at the middle of the time that a data word is valid at the receive processor. Because the data word and RCLK pulse are generated at the send processor, and propagate together on the interprocessor bus to the receive processor, the bus propagation delay time (Tbus) is approximately the same for both signals. Thus, the system eliminates any dependence upon the variations of the bus propagation delay time due to the relative positions of the send and the receive processors on the interprocessor bus.

In every bus system the propagation delays between two points on various lines of the bus are not exactly equal, but vary due to manufacturing imperfections and other physical effects. The maximum variations between propagation delays on any two signals is the maximum skew time of the bus. Thus, the phase relationship established between the data word and the RCLK pulse at the send processor will not be preserved as these signals propagate along the D bus 57 and RCLK line 68, respectively (i.e., as they travel along the interprocessor bus).

FIG. 10 illustrates the relative timing of the data word and RCLK signal at the receive processor IN queue pipeline register 92 (FIG. 3) for a processor-to-processor data transfer. Because of skew, the timing (TR) of the leading edge of the RCLK signal may vary relative to the data word. The position of the leading edge of the RCLK signal may vary over the time interval $TR_{max} - TR_{min}$.

As indicated in FIG. 10, the electrical characteristics of the IN queue pipeline register 92 (FIG. 3) require that a data word be valid for a minimum set-up time, TSU, at the inputs of the IN queue pipeline register 92 prior to the arrival of the leading edge of RCLK. Additionally, the data word must remain valid for a minimum hold time, TH, after the arrival of RCLK. The sum of TSU and TH is the time margin required by the IN queue pipeline register 92. The period of RCLK must be at least equal to the sum of the timing margin and the maximum skew time of the bus. Thus, the data transfer rate is limited by the maximum skew between RCLK and the data word at the receiver. And, because the maximum skew is generated for data transfers between processors at opposite ends of the bus, the maximum data transfer rate is dependent on the length of the bus.

The data transfer system utilized in the present invention is asynchronous. The relative timing between the data words and RCLK is established by the send processor. The data word need not be valid on the entire bus at any given time, but only need be valid with reference to RCLK as the signals propagate along the interprocessor bus. Accordingly, several data words may be propagating along the interprocessor bus at a given time. The interprocessor bus may function as a pipeline register storing several words at a given time.

In a synchronous bus protocol, a single clock signal controls all data transfers. Because the receive processor may be positioned at any point along the bus, a data word must be valid on the entire bus before being strobed into the IN queue section of the receive processor. The period of the synchronous system clock must be of sufficient magnitude to allow the data signals to settle over the entire length of its data bus for a time period at least equal the timing margin requirement. Accordingly the maximum frequency of the clock will depend on the propagation delay of a signal from one end of the bus to the other.

The advantage of the present system over a synchronous bus system is now apparent. The maximum data transfer rate of each system is dependent on the length of the bus. However, in the present system this maximum transfer rate is dependent on the time margins at a given processor and on the maximum skew due to the length of the bus wherein in a synchronous system the transfer rate is dependent on the propagation delay between the ends of the bus. The skew time is generally lower than the propagation delay and thus the maximum transfer rate of the present system is greater than the transfer rate of existing bus systems.

The invention has now been described with reference to specific embodiments. However, various modifications and substitutions will now be apparent to persons skilled in the relevant arts. For example, the number of words in a data packet may be any arbitrary length. The particular state transition tables and state machines are not critical to the invention. Accordingly, it is not intended that the invention be limited except as provided by the appended claims.

What is claimed is:

1. In a multiprocessor computer which includes a bus and two or more processors coupled to said bus, where first and second processors may exchange a packet of data words during a packet transfer cycle, a bus protocol system for controlling access to the bus by the processors and for establishing a sender/receiver processor pair comprising:

means for conducting a first poll of said processors to determine which processors are ready to send a packet over said bus said polling means including means for generating said first poll independent of whether any of the processors are ready to exchange packets of data words;

means for indicating that a selected processor is either ready or not ready to send in response to said first poll;

means for sequentially selecting a given one of said processors indicated as ready in response to said first poll as a send processor, granting said selected processor access to the bus for a complete data transfer cycle to allow said selected processor to send its packet, and selecting another one of said processors indicated as ready in response to said first poll to be send processors in an open loop fashion until all said ready processors have sent their packets unless one of said selected processors indicates it is not ready to send;

means for denying access to the bus to a selected processor which indicates that it is not ready to send when selected by said selecting means and selecting another one of said processors indicated as ready in response to said first poll as a send processor prior to the completion of a data transfer cycle; and means for conducting a second poll of the processors when all of said processors indicated as ready in response to said first poll have either sent their packet or indicated they were not ready to send.

2. In a multiprocessor computer which includes a bus having a plurality of bus lines including lines forming a data bus and two or more processors coupled to said bus, where first and second processors may exchange a packet of data words during a packet transfer cycle, a bus protocol system for controlling access to the bus by the processors and for establishing a sender/receiver processor pair comprising:

means for simultaneously polling all processors to determine which processors are ready to transfer a packet of words to another processor over said bus, said polling means including means or generating said poll independent of whether any of the processors are ready to exchange data words;

means, responsive to said polling, for asserting a set of ready to send signals on the data bus identifying ready processors ready to send;

means, responsive to said set of ready to send signals, for sequentially selecting each of said processors indicated as ready in response to said polling to be a send processor where a following processor is selected after a preceding selected processor has completed its data transfer cycle or has indicated it is not ready to send;

means, at said given selected send processor indicated as ready in response to said polling, for indicating whether said selected send processor has become not ready to send subsequent to the assertion of said set of ready signals; and means for initiating a complete data transfer cycle for each selected ready send processor to enable said selected processor to send data unless said selected send processor indicates it is not ready to send.

3. The bus protocol system of claim 2 further comprising:

means for selecting a given processor to receive said packet during said data transfer cycle;

means for indicating that said receiver processor is not ready to receive said packet; and means for automatically initiating the transfer of data between the selected sender and receiver processors unless said receiver processor indicates that it is not ready to receive.

4. The bus protocol system of claim 2 further comprising:

means for generating a send clock timing signal comprising a plurality of send clock pulses to control the timing of transferring words from each selected ready send processor to said bus;

means for transferring said send clock signal from said send clock generating means to said send processor;

means, at said send processor, for generating a receive clock pulse, with said receive clock pulse being said selected send clock pulse delayed by a fixed delay DR;

means for transferring said receive clock pulse from said send processor to said receiver processor; and means at said receiver processor for loading a word from said bus upon receipt of said receive clock pulse.

5. The bus protocol system of claim 4 further comprising first and second bus lines wherein:

said means for transferring said send clock signal is said first bus line, with said first bus line coupling said send signal generating means to said word strobing means at each of said processors; and said receive pulse transferring means is said second bus line, with said second bus line coupled to said receive pulse generating means and said word loading means at each of said processors.

6. The bus protocol system of claim 5 wherein each bus line has a printer propagation time of a signal from one end of the bus line to the other, said bus having a maximum skew time equal to the maximum of the propagation times of the different bus lines and said receiver transfer means having a timing margin equal to the sum of a set up time and a hold time of said receiver transfer means and wherein the period of said send clock signal is at least about equal to the sum of the maximum skew time and said time margin.

7. The bus protocol system of claim 6 wherein the magnitude of DR is at least equal to one half the period of said send clock signal.

8. A bus protocol system for use in multiprocessor computer systems which includes a data bus and a control bus, a bus controller coupled to the buses, and a set of processors coupled to the buses, said bus protocol system comprising:
  polling means, at said bus controller, for asserting a first polling signal on the control bus, where said polling means asserts said first polling signal independent of whether any of the processors are ready to exchange packets of data words;
  means, at each of said processors, for receiving said first poling signal;
  means, at each processor, for determining whether a given processor is ready to send;
  means, at each processor, responsive to said determining means for generating a response signal subsequent to the receipt of said first polling signal with the response generating means of each processor coupled to a unique one of the lines of said data bus, with the state of said response signal indicating whether a given processor is ready to send as determined by said determining means, ad with the various response signals asserted on the lines of the data bus forming a send mask;
  means, at said bus controller, for receiving said send mask and identifying which processors are ready to send;
  select means, at said bus controller, for sequentially selecting each of said identified ready processors and automatically initiating a complete data transfer cycle for each of the ready processors;
  means, at a selected ready processor for determining whether said selected processor is not ready to send when selected;
  means, at said selected ready processor, for indicating to said bus controller if a selected processor is not ready to send;
  means, at said bus controller, for receiving said indication, aborting the complete data transfer cycle for the selected processor, and causing said select means to select the next ready processor; and
  means, at said bus controller for causing said polling signal generator to generate a second polling signal after said data cycle transfers for each of said identified ready processors have been initiated, so that said processors are continually polled in an open-loop manner and so that said selection of processors and initiation of complete data transfer cycles proceeds automatically unless a not ready indication is received.

9. The bus protocol system of claim 8 further comprising:
  means for selecting a receiver processor to receive a data packet from each selected send processor that is ready to send.

10. The bus protocol system of claim 9 wherein said means for selecting a receiver processor comprises:
  means, at a selected send processor, for selecting a desired receiver processor and enabling said receiver processor to load data from said bus;
  means, at said receiver processor, for indicating that said receiver processor is not ready to load data; and
  means, at said send processor, for automatically transferring a packet to said bus subsequent to selecting and enabling said receiver processor unless said receiver processor indicates it is not ready to load data.

11. The bus protocol system of claim 10 wherein said send processor further comprises:
  a memory element for storing said packet; and
  wherein said means for indicating that a selected send processor is not ready to send comprises:
  means at said send processor for determining whether said memory element has a packet stored therein, and
  means at said send processor for generating negative acknowledgement signal if said memory element does not have a packet stored therein to indicate that said processor is not ready to send.

12. In a multiprocessor computer which includes a bus having a plurality of bus lines and two or more processors coupled to said bus, where first and second processors may exchange a packet of data words during a packet transfer cycle, and a bus protocol for controlling access to the bus by the processors and for establishing a sender/receiver processor paid, a timing system for providing timing signals to transfer words between the sender/receiver pair at a high rate, said timing system comprising:
  a bus having first and second bus lines, each connected in parallel to a send processor and a receiver processor with each bus line having a finite propagation time of a signal from one end of the bus line to the other end of the bus line, said bus having a maximum skew time equal to the maximum of the propagation times of the different bus lines;
  means for generating a send clock timing signal comprising a plurality of send clock pulses separated by a fixed period and asserting said send clock signal on said first bus line;
  means, at said send processor, coupled to said first bus line, for transferring a given data word to the data bus upon receipt of a given send clock pulse;
  means, at said send processor, for delaying said given send clock pulse by a fixed delay DR, and asserting said delayed clock pulse on said second bus line; and
  means, at said receiver processor, coupled to said second bus line, for loading said given word from said bus upon receipt of said delayed clock pulse and said means for loading having a timing margin equal to the sum of a set up time and a hold time of said means for loading and wherein the period of said send clock signal is at least equal to the sum of the maximum skew time and said timing margin.

13. The bus protocol system of claim 12 wherein the magnitude of DR is at least equal to one half the period of said send clock signal.

14. An interface for coupling a processor to a bus communication system that couples a plurality of processors and that includes a data bus having a first fixed number of bus lines, a control bus having a second fixed number of bus lines, a receive command line, a send clock line and a receive clock line and a negative acknowledge line, and controlled by a bus controller that polls the processors at predetermined intervals by sending a poll signal on the control bus and controls the transfer of data between first and second ones of the processors coupled to the bus when the first processor is ready to send, and where the bus controller asserts an SCLK timing signal, including a plurality of SCLK pulses separated by a fixed time period, on the SCLK line where a send processor is selected by asserting a send signal on the control bus and the processor address of the selected send processor on the data bus, with the first and second processors identified, respectively, by first and second processor addresses, said interface associated with the first processor and comprising:

means, coupled to a first one of said data bus lines, for asserting a ready signal on said first data bus line, in response to the poll signal, only if the first processor is ready to send data;

means, coupled to the NAK line, for asserting a NAK signal when the first processor is selected by the bus controller only if the first processor becomes not ready to send subsequent to asserting the ready signal to cause the bus controller to select another processor as a send processor;

means for asserting a RCVCMD signal on the RCVCMD line and the second processor address on said data bus to select the second processor as a receive processor;

means, at said send processor coupled to the SCLK bus line, for transferring a given data word to the data bus upon receipt of a given SCLK pulse unless a NAK signal is asserted on the NAK line so that data is transferred to the second processor only when the first processor is selected by the bus controller subsequent to asserting the ready signal, and only if the first processor is ready to send data; and means, at said send processor, for delaying said given send clock pulse by a fixed delay DR, equal to about ½ the duration of said fixed period and asserting said delayed pulse on said RCVCOMD line as a RCVCMD pulse positioned at about a midpoint of said transferred data word.

* * * * *